United States Patent [19]
Ueda et al.

[11] Patent Number: 5,332,438
[45] Date of Patent: Jul. 26, 1994

[54] VERTICAL TYPE DIP TREATING DEVICE

[75] Inventors: Takaaki Ueda; Yuji Takahara; Mitumori Kasada; Toshiharu Taniguchi; Fukuiti Siyama, all of Kobe, Japan

[73] Assignee: Bando Chemical Industries, Ltd., Kobe, Japan

[21] Appl. No.: 900,764

[22] Filed: Jun. 19, 1992

Related U.S. Application Data

[63] Continuation of Ser. No. 658,381, Feb. 20, 1991, abandoned.

[30] Foreign Application Priority Data

| Feb. 21, 1990 | [JP] | Japan | 2-41733 |
| Feb. 21, 1990 | [JP] | Japan | 2-41734 |
| Feb. 21, 1990 | [JP] | Japan | 2-41735 |
| Feb. 21, 1990 | [JP] | Japan | 2-41736 |
| Feb. 23, 1990 | [JP] | Japan | 2-43348 |
| Mar. 28, 1990 | [JP] | Japan | 2-79970 |
| Dec. 25, 1990 | [JP] | Japan | 2-405703 |

[51] Int. Cl.⁵ ........................ B05C 11/00; B05C 3/12; B65H 59/00; B65H 54/02
[52] U.S. Cl. ........................ 118/65; 118/67; 118/69; 118/420; 118/423; 118/429; 242/35.5 R; 242/147 R; 242/154
[58] Field of Search ............... 118/419, 420, 423, 65, 118/67, 69, 429; 68/9; 242/35.5 R, 35.5 A, 45, 154, 147 R

[56] References Cited

U.S. PATENT DOCUMENTS

| 1,759,850 | 5/1930 | Janicki | 118/420 X |
| 3,128,206 | 4/1964 | Dungler | 118/419 X |
| 3,145,939 | 8/1964 | Mason et al. | 242/35.5 R |
| 3,265,525 | 8/1966 | Lichte . | |
| 3,313,646 | 4/1967 | van Zalinge | 118/67 X |
| 4,342,430 | 8/1982 | Kasai et al. | 242/35.5 R X |
| 4,398,677 | 8/1983 | Henrich | 242/45 X |
| 4,530,471 | 7/1985 | Inoue | 242/45 |

FOREIGN PATENT DOCUMENTS

| 1427644 | 11/1968 | Fed. Rep. of Germany . |
| 8606991.8 | 11/1986 | Fed. Rep. of Germany . |
| 2138714 | 10/1984 | United Kingdom . |

Primary Examiner—W. Gary Jones
Assistant Examiner—Steven P. Griffin
Attorney, Agent, or Firm—Sixbey, Friedman, Leedom & Ferguson

[57] ABSTRACT

A vertical type dip treating device for applying adhesives to a cord to be used for a tension member of belt, etc. This device comprises dip tanks for applying adhesives to a cord, heaters and dryers arranged above the dip tanks for heating and drying a cord to which adhesives have been applied in the dip tanks, coolers adjacent to the heaters and dryers for cooling a cord heated and dried by the heaters and dryers, hot air supplies connected adjacently to the heaters and dryers for supplying hot air to the heaters and dryers and exhausts connected adjacently to the heaters and dryers and arranged vertically beneath the hot air supplies for discharging exhaust from the heaters and dryers.

22 Claims, 15 Drawing Sheets

VERTICAL TYPE DIP TREATING DEVICE

This application is a continuation of Ser. No. 658,381, filed Feb. 20, 1991, now abandoned.

BACKGROUND OF THE INVENTION

Field of the Invention

This invention relates to a vertical type dip treating device for applying a single kind or plural kinds of adhesives to a cord which is used for a tension member of belt or the like.

Conventionally, in order to improve adhesiveness of a cord to be used as a tension member of a belt, a dip treating machine for applying adhesives to the surface of a cord has been known. Such dip treating machine requires a dip tank, a drying means (drying space part) for drying a cord after dip treatment, a drawing and heat setting means (heat setting space part) for preventing thermal shrinkage at the vulcanizing of belts, a hot air supplying means for supplying hot air to the drying, drawing and heat setting means, an exhausting means for exhausting hot air, and the like.

Since the conventional dip treating machine has the above-mentioned various means arranged flatly and laterally, it involves the problem of requirements of wide space for arrangement. Especially in the case of nylon cords, polyester cords, etc., drawing means and heat setting means are absolutely required and an extra space is required for arrangement of such drawing and heat setting means, with the result that the treating machine as a whole requires a fairly large space for its installation.

Concretely, as shown in FIG. 30 the conventional dip treating machine is so composed that a cord 200 runs from a first pull roller device 201 to a fourth pull roller device 215, via a first dip tank 202, a first heating zone 203, a first cooling device 204, a second pull roller device 205, a second dip tank 206, a second heating zone 207, a second cooling device 208, a third pull roller device 209, a third dip tank 210, a third heating zone 211, a third cooling device 212, a fourth dip tank 213, a fourth heating zone 214, and a fourth pull roller device 215 in the order given.

In the above devices, it is intended to give tension to a cord by speed differentials between the first pull roller device 201 and the second pull roller device 205 (normally, −5−+5%) but setting of tension at treatment of a cord by such system requires eight pull rollers for each of the first pull roller device 201 and the second pull roller device 205. In addition, it is required to control the eight pull rollers so that all of them run at the same speed. Such requirements necessarily make the machine larger structurally, far from compactness of the machine.

SUMMARY OF THE INVENTION

A main object of the present invention is to provide a vertical type dip treating device which is compact in size and does not require much space for its installation.

In order to attain the above object, the dip treating device for sticking or applying adhesives to a cord to be used as a tension member of a belt, which according to the present invention comprises mainly a dip tank means for sticking adhesives to a cord, a heating and drying means arranged above said dip tank means for heating and drying a cord which adhesives were stuck by said dip tank means, cooling means arranged adjacent to said heating and drying means for cooling a cord which was previously heated and dried by said heating and drying means, a hot air supplying means connected adjacently to said heating and drying means, and an exhausting means connected adjacently to said heating and drying means and arranged in the position shifted from the hot air supplying means in a vertical direction for discharging exhaust from the hot air supplying means.

Therefore, a cord which was treated by the dip tank means at the lower part moves upwardly and is heated and dried by the heating and drying means which is arranged at the upper part. Since the heating and drying means and the dip tank means are arranged in vertical direction and the cooling means, the hot air supplying means and the exhausting means are arranged adjacent to the heating and drying means at the upper part, much arrangement space is not required, compactness can be planned and effective dip treatment can be carried out in a small space.

The heating and drying means has an oven and an upper fluted turn roller and a lower fluted roller arranged upwardly and downwardly of said oven. A cord is wound around by plural turns between the upper and the lower fluted turn rollers.

As a cord is wound around by plural turns between the upper and the lower fluted turn rollers and heating and drying of a cord which passed through the dip treatment is carried out in vertical direction, heating and drying of the cord after dip treatment can be carried out in a small space.

The dip tank means has a dip tank in which adhesives (RFL liquid) are kept and the heating and drying means has a top roller which exposes itself at the upper part of the oven and is above the upper fluted turn roller. It is so composed that a cord which is wound around the upper fluted turn roller is firstly wound around the top roller.

Therefore, a cord to which adhesives were stuck is firstly drawn outside the heating and drying means by the top roller for ensuring drying of adhesives and promoting reaction. Thus, sticking of adhesives to the fluted turn rollers can be prevented.

The dip tank means further comprises at least one dip roller which is arranged rotatably in the dip tank and around which a cord to be dip-treated is wound, an axis member which has an axis part to be put through a center hole of the dip roller and supports the dip roller rotatably and a coil spring interposed rotatably between the center hole of the dip roller and the axis part of the axis member.

The coil spring turns with the rotation of the dip roller and by the rotation of the coil spring adhesives between the center hole of the dip roller and the axis part of the axis member move outside the dip roller, whereupon new adhesives flow in from the outside. Thus, there exists flowing of adhesives at all times and consequently no coagulation of adhesives occurs.

The present invention further comprises a tension controller which controls tension to be given to a cord composing a tension member of belts so that it is kept substantially constant. This controller is provided with a tension bar with its base end supported rotatably by a base frame and its flute formed in the axial direction, a tension weight means engaged slidably with the flute of said tension bar, a tension roller which is supported rotatably by said tension bar and around which a cord is wound, an angle detector which is linked with said tension bar and detects the angle of inclination of the tension bar and a control means which controls the running speed of a cord by receiving a signal from said angle detector so that the tension bar is kept in a horizontal state. At least the tension roller should preferably be a non-adhesive pulley made of aramid resin containing polytetrafluoroethylene so as to prevent attaching of soil.

In the above composition, regulation of tension to be Given to a cord through the medium of the tension roller is carried out by regulating the position of the tension weight means along the flute of the tension bar. The running speed of a cord is controlled so that the tension bar is kept in a horizontal state and substantially constant tension is given to the cord. Therefore, even under the compact construction, a cord having the fixed physical property can be obtained by keeping the tension bar supporting the tension roller in a horizontal state and by giving constant tension to a cord. Since the tension roller is made of aramid resin containing polytetrafluoroethylene, polytetrafluoroethylene functions as sticking preventive agent for a long time, with the result that the soil non-attaching effect is maintained for a long time. Also, since the tension roller is made of aramid resin, it is light in weight and high in hardness, almost free from deformation and wear. Therefore, it can be used until the pulley is broken down. The problems associated with of polytetrafluoroethylene, namely, easiness to break due to poor heat-resistance, brittleness, etc. can be improved by making polytetrafluoroethylene contained in aramid resin which is high in strength, elasticity, heat-resistance and wear-resistance.

The present invention still further comprises a pull roller device which cuts tension of a cord. This pull roller device is equipped with a plain pull roller, a fluted pull roller having a plurality of flutes and driving means which drives both pull rollers to rotate them simultaneously. A cord entered in the fluted pull roller is wound around between both pull rollers and runs out of the fluted pull roller.

Therefore, a tension member is wound around by several turns between the fluted pull roller and the plain pull roller and tension before and behind the pull roller device is cut and only two pull rollers will suffice. Thus, compactness can be planned.

The present invention further comprises an automatic winding machine which rolls continuously a cord (tension member of belt) around a first bobbin and a second bobbin which are arranged coaxially in a row with the specified space therebetween, a movable stand disposed movably between the first bobbin and the second bobbin, a traverse pulley supported rotatably by said movable stand, an engaging member fitted to said traverse pulley and projecting radially, a guide member which is fitted to the traverse pulley and guides the cord outwardly of the radial direction of the traverse pulley, a stopper which engages with the engaging member when the traverse pulley moves and displaces the guide part of the guide member upwardly by rotating the traverse pulley and driving means which is linked with the movable stand and moves it.

At the bobbin change, the traverse pulley is moved by the driving means. At this time, the engaging member engages with the stopper and the guide part of the guide member is displaced upwardly by rotating of the traverse pulley, whereby a cord is lifted upwardly and is put in tensioned state. Thus, bobbin change can be done (full bobbin to empty bobbin) accurately, without drooping of a cord between bobbins, and a cord can be wound around two bobbins continuously.

The present invention still further comprises an automatic cord winding machine by which a cord (tension member of belt) which was wound by plural turns around a pull roller device having a pair of pull rollers is wound continuously around the first and the second bobbins arranged coaxially in a row at the specified intervals, a traverse pulley which when changing bobbins traverses between the first bobbin and the second bobbin and guides a cord from a full bobbin to an empty bobbin at bobbin change and a dancer roller which is disposed between the pull roller device and the traverse pulley and gives tension to a cord at all times.

Therefore, tension is Given to a cord between the pull roller device and the traverse pulley by the dancer roller and slackening of a cord at bobbin change is absorbed before it is transferred to the pull roller device. Thus, a cord is kept in tensioned state at all times and there is no fear that a cord droops from the pull roller of the pull roller device.

To sum up, the present invention is a dip treating device for sticking plural kinds of adhesives to a cord to be used as a tension member of belt, etc. and comprises a plurality of dip tank means for sticking adhesives to a cord, a plurality of heating and drying means, each being arranged above a corresponding dip tank means for heating and drying a cord to which adhesives were applied by a corresponding dip tank means, a plurality of cooling means, each being arranged adjacent to corresponding heating and drying means for cooling a cord heated and dried by a corresponding heating and drying means, at least one hot air supplying means which is connected adjacently to the heating and drying means and supplies hot air to each heating and drying means and at least one exhausting means which is connected adjacently to the heating and drying means and discharges exhaust from each heating and drying means.

In the above composition, plural kinds of adhesives (dip treating liquid) are stuck by a plurality of dip tank means by repetition of "sticking-drying" cycle and therefore dip treatment with plural kinds of adhesives can be carried out effectively in a small space.

The above and other objects of the present invention will be understood more clearly from the following detailed description of the invention, with reference to the accompanying drawings.

BRIEF DESCRIPTION OF THE DRAWINGS

The accompanying drawings show preferred embodiments of the present invention, in which.

DETAILED DESCRIPTION OF THE INVENTION

Embodiments of the present invention will be described below with reference to the accompanying drawings.

Figure 1:
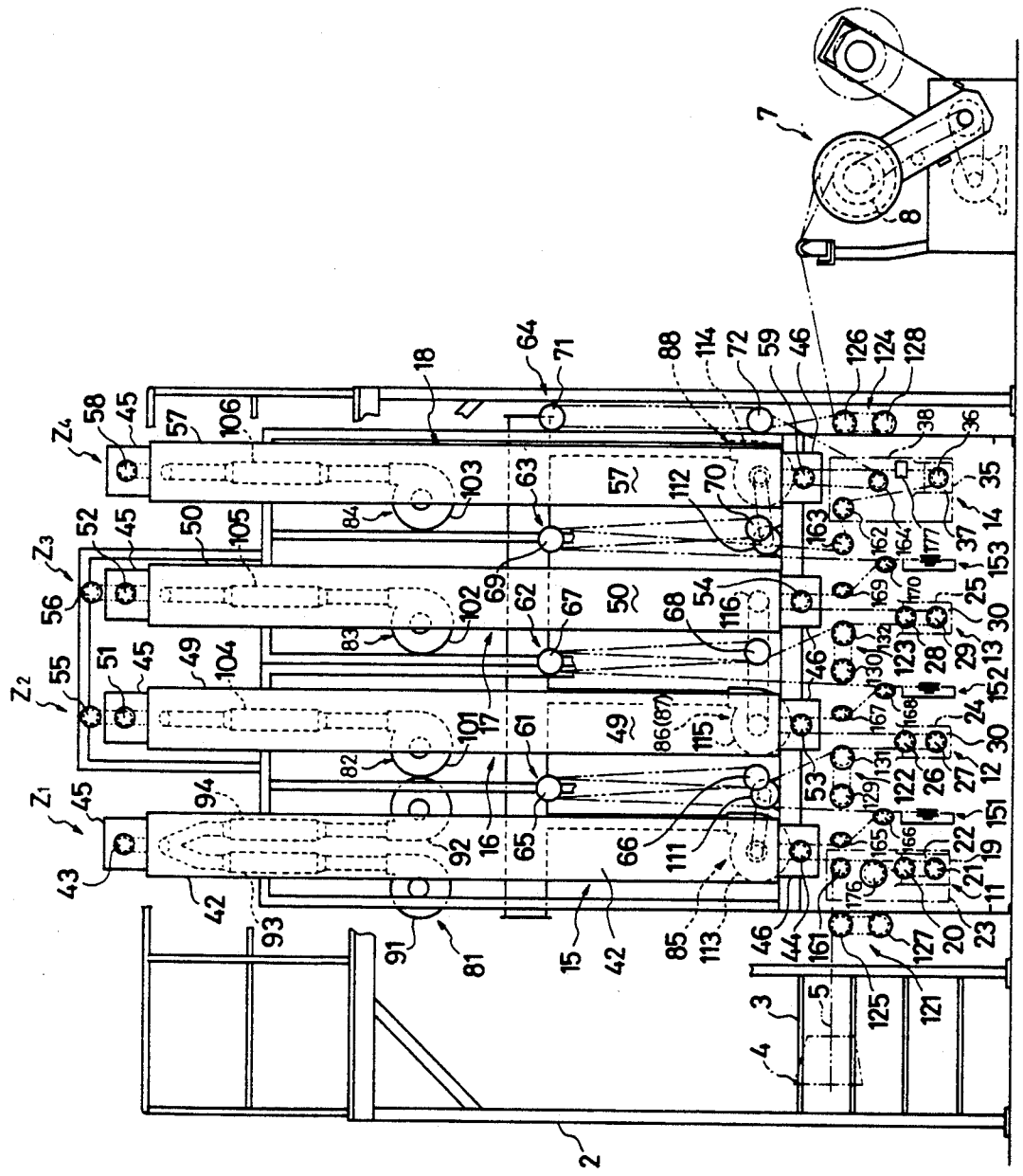
FIG. 1 and FIG. 2 show respectively a front view and a side view of a vertical type dip treating device.
Figure 2:
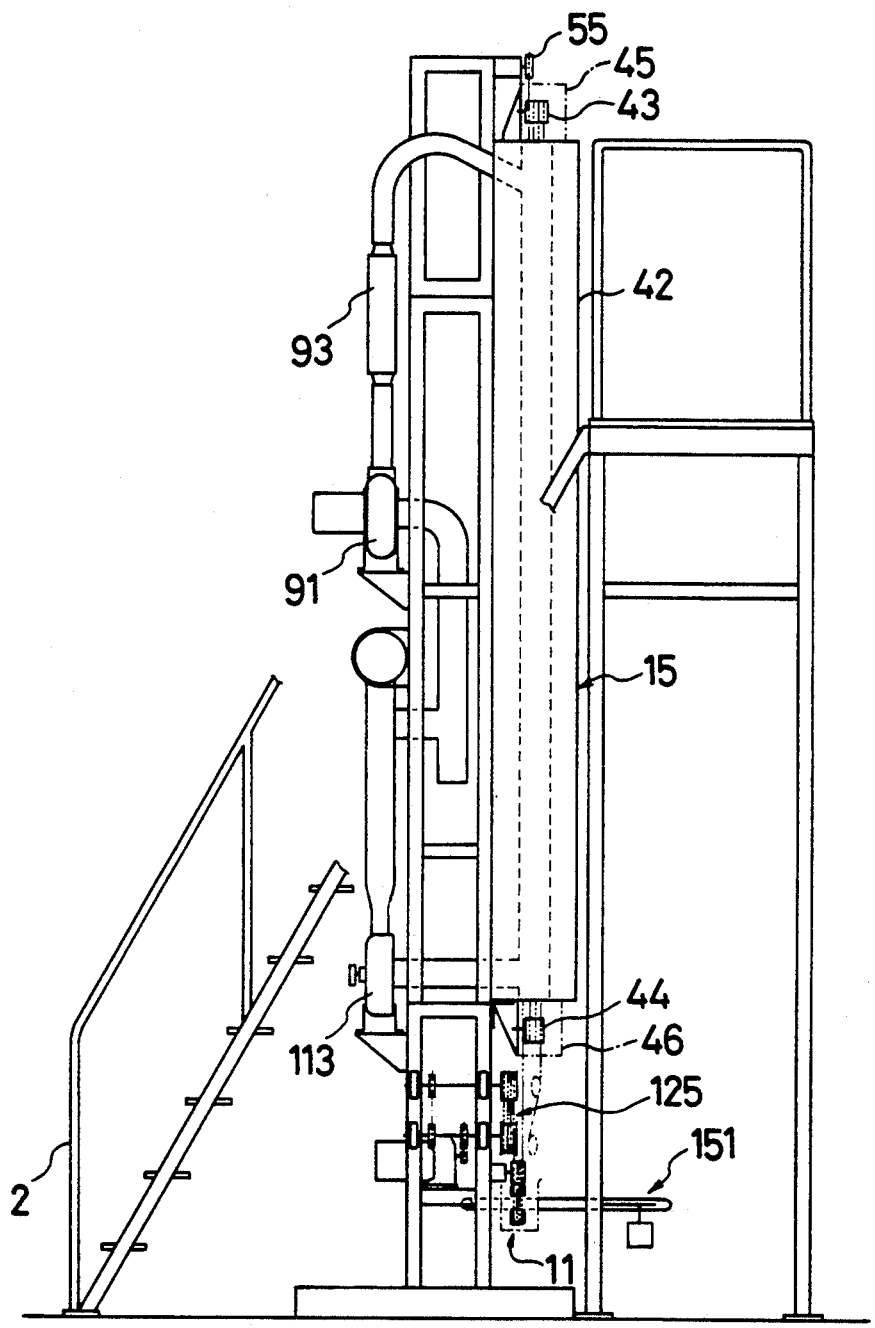

FIG. 1 and FIG. 2 show the overall composition of a vertical type dip treating device. A dip treating device 1 has a creel stand 3 at the lower part of an inspecting stand 2. An untreated cord 5 which is drawn out from a cheese 4 supported rotatably by the creel stand 3 is treated at the first zone $Z_1$ through the fourth zone $Z_4$ with three kinds of adhesives (dip treating liquid) and the treated cord 5 is wound continuously around a first bobbin 8A and a second bobbin 8B which are arranged coaxially in a row at an automatic winder 7.

At each of the zones $Z_1$–$Z_4$, first dip tank means 11, second dip tank means 12, third dip tank means 13 and fourth dip tank means 14 are arranged at the lower part. Arranged at the upper part of each of the dip tank means 11, 12, 13, 14 are first heating and drying means 15, second heating and drying means 16, third heating and drying means 17 and fourth heating and drying means 18 respectively. Thus, the first through the fourth heating and drying means 15-18 and the first through the fourth dip tank means 11-14 are arranged above and below respectively on the substantially same level. At the first dip tank means 11, a pair of dip rollers 20, 21 (a plain roller at the upper part and a fluted roller at the lower part) around which the cord 5 is wound by plural turns (for example, by four turns) are arranged above and below in a first dip tank 19 and these dip rollers 20, 21 are soaked in adhesives 22. The first dip tank 19 is surrounded with a cover member 23 to be isolated from the surroundings. The reason why two dip rollers 20, 21 are provided is that by winding the cord 5 around between the two rollers by plural turns, the cord 5 is dipped in the adhesives 22 for a longer time.

In the second dip tank means 12 and the third dip tank means 13, a pair of dip rollers 26, 27 and a pair of dip rollers 28, 29 around which the cord 5 is wound by plural turns are arranged above and below respectively. These two dip tank means 12, 13 are the same as the first dip tank means 11 in that dip rollers 26, 27, 28, 29 are soaked in adhesives 30 but are not covered with a cover member.

Figure 3:
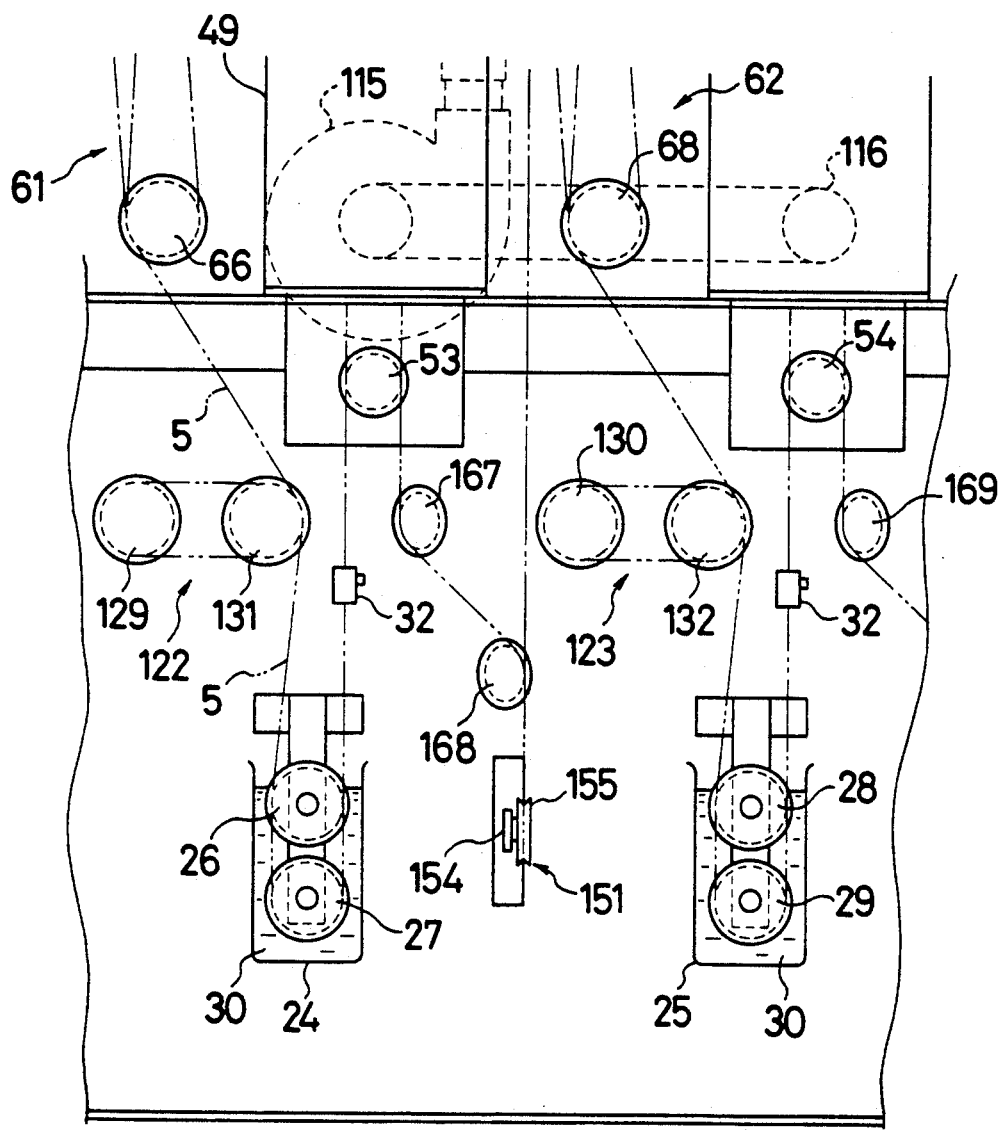
FIG. 3 is an explanatory drawing of the second and the third dip tank means.
Figure 4:
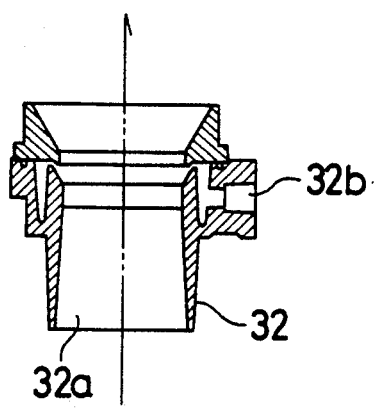
FIG. 4 is a cross sectional view of an air wiper.

As shown in FIG. 3, the cord 5 drawn out from the second and the third dip tanks 24, 25 is passed through an air wiper 32, whereby the quantity of adhesives 30 to be stuck to the cord 5 is controlled. As shown in FIG. 4, the air wiper 32 has an air supply opening 32b, through which compressed air is supplied to a hole 32a through which the cord 5 passes. By controlling the quantity of compressed air supply, the desired quantity of adhesives to be stuck can be obtained. At the first and the fourth zones $Z_1$, $Z_4$, a touch roller which acts as a wiper and a sponge 177 are used in place of the air wiper.

Figure 5:
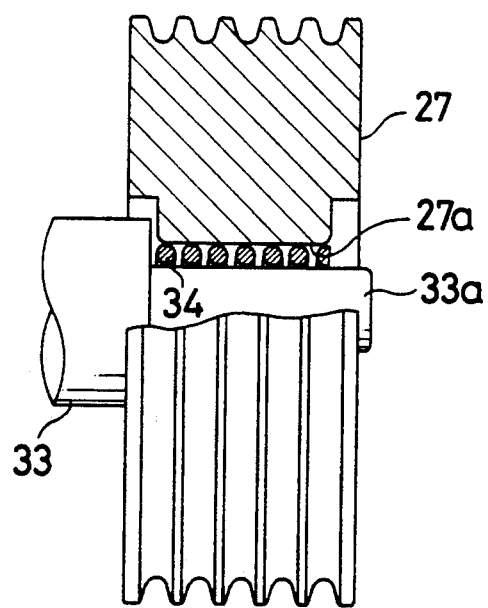
FIG. 5 is a cross sectional view of a fluted dip roller at the underside.

With regard to the fluted dip rollers 27, 29, as shown in FIG. 5 for the dip roller 27, a coil spring 34 is interposed between an axis part 33a of an axis member 33 which supports the dip roller 27 rotatably and a center hole 27a of the dip roller 27. The coil spring 34 rotates with the rotation of the dip roller 27 and by the rotation of the coil spring 34, flowing of adhesives occurs in the center hole 27a of the dip roller 27 and accordingly coagulation of adhesives can be restricted. Although not shown in the drawing, the dip roller 27 is fixed to the axis member 33 by means of a snap ring. Similarly, a coil spring is interposed in relation to the plain dip rollers 26, 28 at the upper part.

The fourth dip tank means is different from the first dip tank means in that only one fluted dip roller 36 around which the cord 5 is wound by two turns (instead of two dip rollers) is arranged in a dip tank 35 which receives adhesives therein but is the same as the latter in that the dip tank 35 is surrounded with a cover member to be isolated from the surroundings.

The reason why the first dip tank 19 and the fourth dip tank 35 are covered with the cover member 23, 38 is that since toluene is used as solvent for adhesives, it is required to locally exhaust the inside by a blower 113, 114 of an exhausting means 85, 88 (to be described later). Adhesives in the second and the third dip tanks 24, 25 are not of solvent (toluene) system but of water system and therefore local exhausting is not required. More particularly, adhesives received in each of the dip tanks 19, 24, 25, 35 are isocyanate+toluene for the first dip tank 19, RFL (resorcin, formalin, latex)/water for the second and the third dip tanks 24, 25 and gum arabic+toluene for the fourth dip tank 35. Each kind of the above adhesives fulfills its function when dried. At the second zone $Z_2$ and the third zone $Z_3$, the cord is subjected to the dip treatment twice because the required quantity of sticking cannot be obtained by one time dip treatment. The final dip treatment using gum arabic at the fourth dip tank 35 if for the purpose of protecting RFL from ultraviolet rays and keeping adhesiveness to the rubber sheet at forming of a belt.

Figure 26:
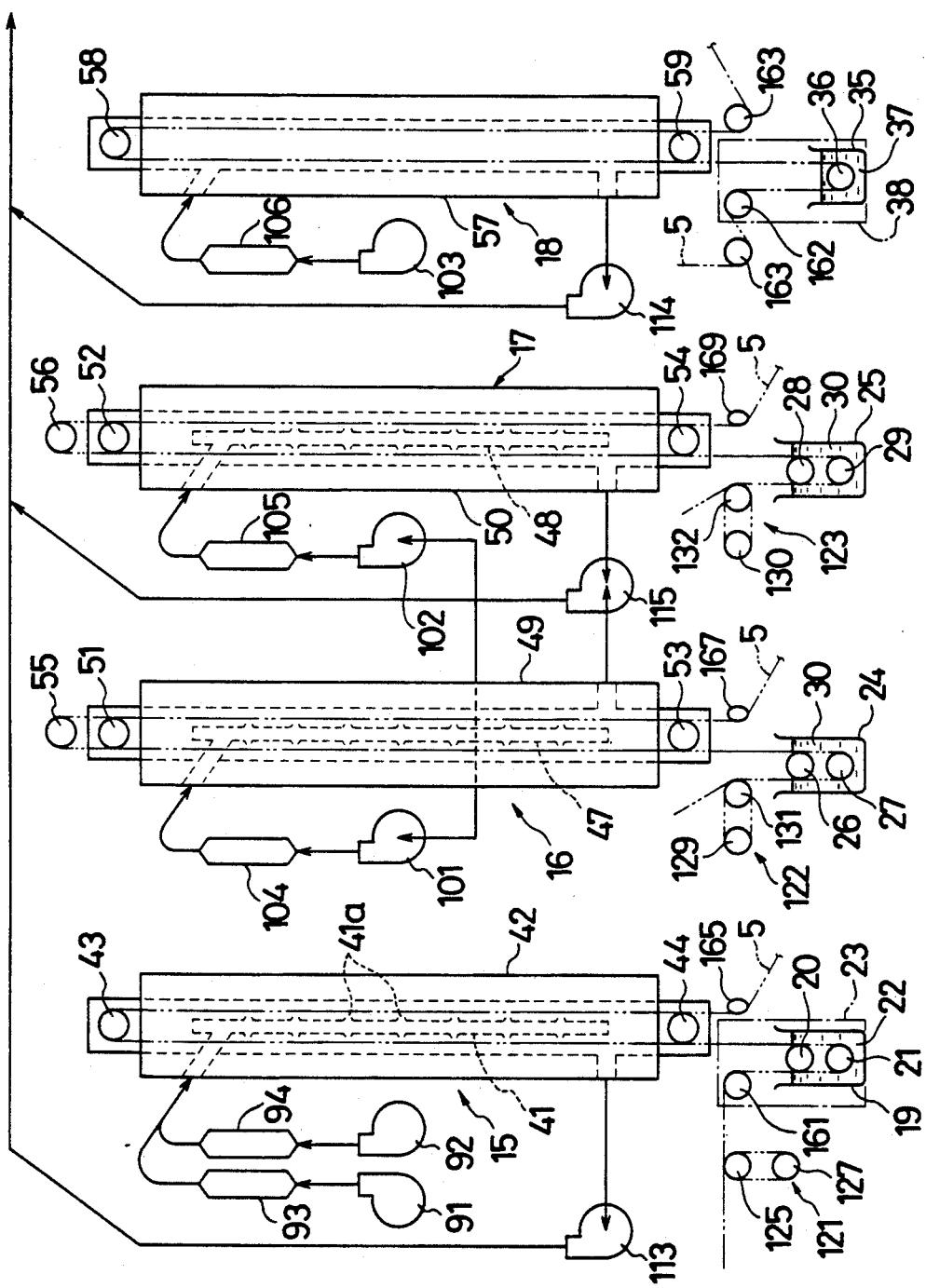
FIG. 26 is an explanatory drawing, showing the flowing of intake and exhaust.

The first heating and drying means 15 has an oven 42 which is long in vertical direction and has within a hollow slit member 41 so that uniform heating can be carried out in a vertical direction (refer to FIG. 26). Provided at the upper part and the lower part of the oven 42 are an upper fluted turn roller 43 and a lower fluted turn roller 44 respectively. The cord 5 enters in the oven 42 from its lower part, is wound around the upper fluted turn roller 43 and the lower fluted turn roller 44 by plural turns and is drawn out from the lower part.

The second and the third heating and drying means 16, are the same as the first heating and drying means 15 in that each of the former has a slit member 42, 48, an oven 49, 50, an upper fluted turn roller 51, 52 and a lower fluted turn roller 53, 54 respectively, but are different from the latter (the first heating and drying means) in that a top roller 55, 56 around which the cord 5 is wound is arranged above the upper fluted turn roller 51, 52. The reason why the cord 5 running upwardly is firstly wound around the top rollers 55, 56 located above the upper fluted turn rollers 51, 52, namely, is put out from the ovens 49, 50 is for the purpose of promoting drying and effect of RFL liquid and preventing RFL liquid from sticking to the fluted turn rollers 51, 52, 53, 54.

The fourth heating and drying means 18 is the same as the first heating and drying means 15 in that the former has an upper fluted turn roller 58 and a lower fluted turn roller 59 but is different from the latter in that the former has no slit member within an oven 57.

The upper fluted turn rollers 43, 51, 52, 58 and the lower fluted rollers 44, 53, 54, 59 of the first through the fourth heating and drying means 15-18 are covered with an oven top cover 45 and an oven under cover 46 respectively.

Arranged adjacently to the side of the first through the fourth heating and drying means 15-18 are the first through the fourth cooling means 61-64 for cooling the cord 5.

Three thermocouples (not shown in the drawing) for temperature control are arranged at substantially regular intervals and in a vertical direction in each of the ovens 42, 49, 50, 57. These thermocouples detect temperature.

The first through the fourth cooling means 61-64 are arranged below between the ovens 42, 49 of the first and the second heating and drying means 15, 16, below between the ovens 49, 50 of the second and third heating and drying means 16, 17, below between the ovens 50, 57 of the third and fourth heating and drying means 17, 18 and below the fourth heating and drying means 18 at the side opposite to the third heating and drying means 17 respectively. Each cooling means 61-64 is provided with a pair of rollers 65, 66, a pair of rollers 67, 68, a pair of rollers 69, 70 and a pair of rollers 71, 72 respectively. The cord 5 heated and dried is wound around the rollers 65-72 by plural turns and is cooled below the specified temperature. The reason why the cord 5 is thus cooled is that in the case of polyester cord, for example, the first glass transition temperature is considered to be around 70° C. and if tension is given to the cord at the temperature higher than this, physical property of the cord changes. More particularly, the temperature of a cord which is just drawn out from the oven 42, 49, 50 is usually 70° C. or higher and such cord temperature can cause irregularity of physical property cord due to tension which occurs at the first though the fourth pull rollers devices 121-124 (to be described later). Therefore, the cord 5 which is drawn out from the oven 42, 49, 50, 57 is cooled below 70° C. so as to stabilize its physical property.

Arranged above and below the first through the fourth heating and drying means 15-18 are the first through the fourth hot air supplying means 81-84 for supplying hot air to the first through the fourth heating and drying means 15-18 and the first through the fourth exhausting means 85-88 for discharging exhaust from the first through the fourth heating and drying means 15-18 respectively.

The first hot air supplying means 81 is so designed that it heats air from two direct driving type blowers 91, 92 into hot air and supplies it to the oven 42 from an upper opening thereof. A thermostat (not shown in the drawing) for regulating the temperature is arranged at the downstream side of the heater 93, 94.

The second, the third and the fourth hot air supplying means 82, 83, 84 have one direct driving type blower 101, 102, 103 and one heater 104, 105, 106 respectively.

The first and the fourth exhausting means 85, 88 have respectively a blower 113, 114 which are driven for rotation by driving motors 111, 112 and sucks and discharges exhaust from a lower opening of the ovens 42, 57 and also discharges exhaust from the inside of the cover members 23, 38 of the first and the fourth dip tank means 11, 14.

The second and the third exhausting means 86, 87 are composed of a common blower 115 and supply exhaust (hot air) discharged from the lower opening of the ovens 49, 59 to blowers 101, 102 of the hot air supplying means for recirculation and reuse. The blower 115 is arranged at the second zone $Z_2$ and a driving motor (only a driving pulley 116 is shown in the drawing) is arranged at the third zone $Z_3$.

Figure 6:
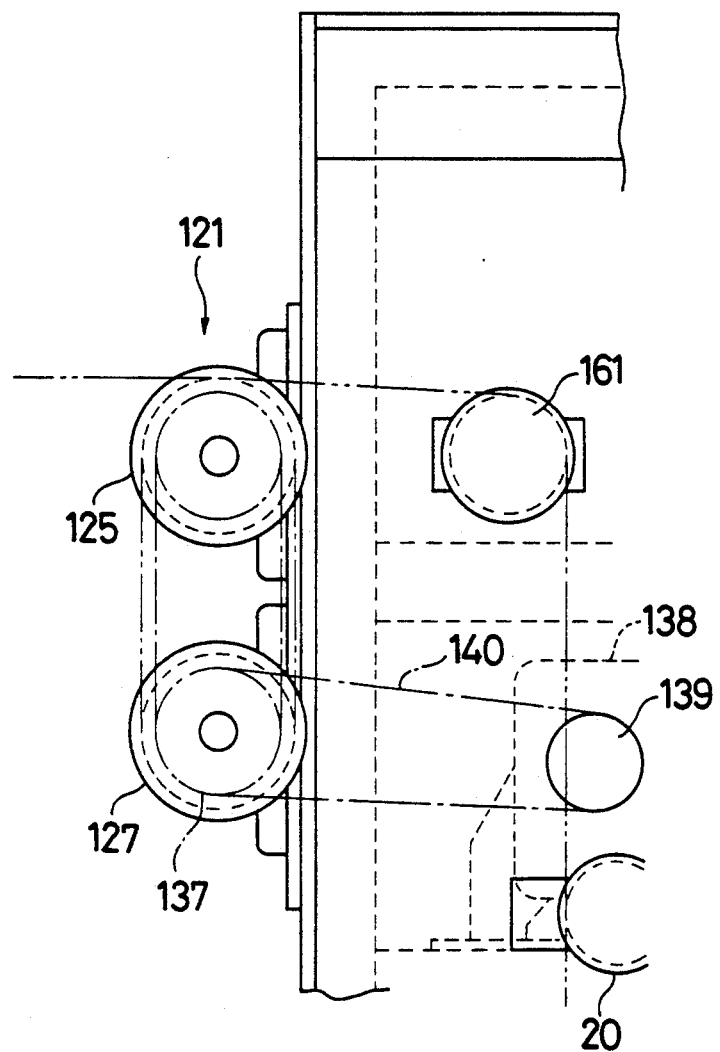
FIG. 6 and FIG. 7 are a front view and a side view respectively of the first pull roller device.
Figure 7:
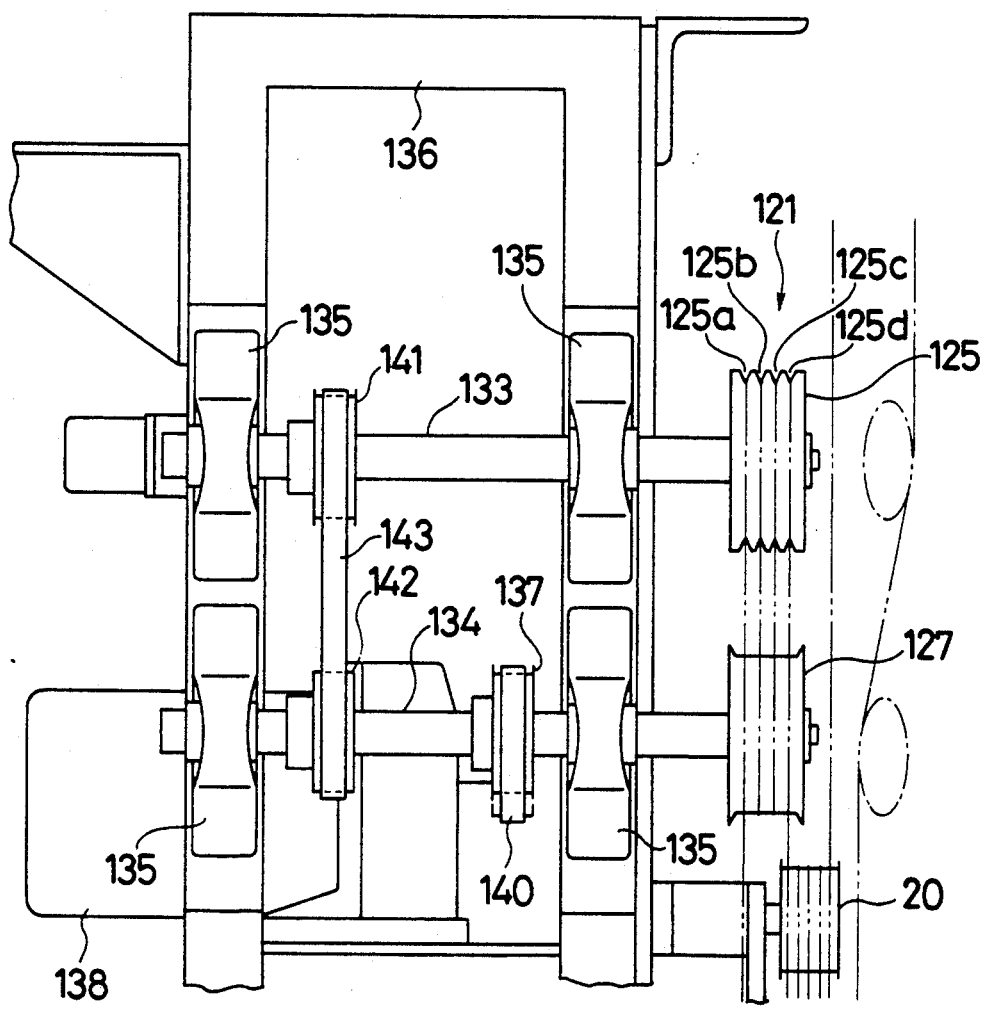

Arranged at the front side of the first, the second and the third dip tank means 11, 12, 13 and at the backside of the fourth zone $Z_4$ are the first, the second, the third and the fourth pull roller devices 121, 122, 123, 124 respectively for cutting tension before and behind the pull roller devices 121, 122, 123, 124. While the first and the fourth pull roller devices 121, 124 are composed of a fluted pull roller 125, 126 and a plain pull roller 127, 128, the second and the fourth pull roller devices are composed of a fluted pull roller 129, 130 and a plain pull roller 131, 132 respectively. Referring to the first pull roller device 121, for example, as shown in FIG. 6 and FIG. 7, an axis part 133, 134 of each pull roller 125, 127 is supported rotatably by a frame body 136 through the medium of a bearing 135. The fluted pull roller 125 has four flutes 125a, 125b, 125c, 125d around which the cord 5 is wound by several turns. The cord 5 which enters in the flute 125a is wound around between both pull rollers by plural turns (four turns) and is drawn out from the flute 125d.

A synchro-pulley 137 is fixed to the axis member 134 at the side toward the plain pull roller 127. This pulley 137 is linked with a synchro-pulley 139 through the medium of a synchro-belt 140. Synchro-pulleys 141, 142 are fixed to the axis members 133, 134 respectively. These synchro-pulleys 141, 142 are linked with each other so that they rotate synchronously by means of a synchro-belt 143.

A first tension control device 151, a second tension control device 152 and a third tension control device 153 for keeping the cord in the fixed tension are arranged between the first and the second zones $Z_1$, $Z_2$, between the second and the third zones $Z_2$, $Z_3$ and between the third and the fourth zones $Z_3$, $Z_4$ respectively.

Figure 8:
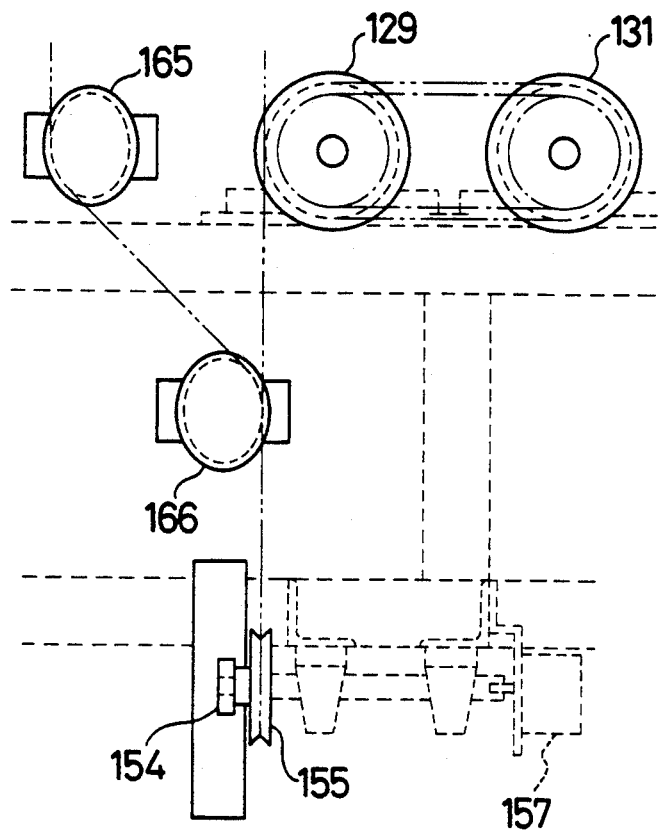
FIG. 8 and FIG. 9 are a front view and a side view respectively of the first tension control device.

The first through the third tension control devices 151, 152, 153 are basically of the same composition. For example, the first tension control device 151 (as shown in detail in FIG. 8 and FIG. 9) has a tension bar 154 whose base end portion 154a is supported rotatably and whose top end portion 154b is a free end displacable in a vertical direction. A tension roller 155 is supported rotatably by projecting axis part 154c at the position close to the base end portion 154a and a slotted portion 154d in an axial direction is formed in the tension bar 154 at the position toward the top end portion from the tension roller 155. Tension weight means 156 is fitted to the straight flute portion 154c in such a fashion that its position is adjustable along the slotted portion 154d. By adjusting the position of the tension weight means 156, regulation of tension is carried out. The tension roller 155 is made of aramid resin (aramid resin of para-system, aramid resin of metha-system) containing polytetrafluoroethylene so as to avoid sticking of adhesives and others thereto. Rollers other than the tension roller can be formed in the same way.

As shown in FIG. 9 through FIG. 18, the tension weight means 156 has a slider 172 (with an operation knob 171) engaged slidably with the slotted portion 154d of the tension bar 154, a hanger 173 fitted to the slider 172 and a weight 174 to be placed on the hanger 173. The slider 172 has an axis part 172c which carries plane parts 172a and curved parts and engages slidably with the straight flute 154d, an engaging part 172f of rectangular plate-like shape which is connected to one side of the axis part 172c through the medium of a flange 172d and has a fitting hole 172e and a screw part 172g which is connected to the other side of the axis part 172c and to which the screw hole 171a of the operation knob 171 is screwed. The hanger 173 has a hook part 173a which is fitted in a fitting hole 172e of the engaging part 172f of the slider 172, an axis part 173b extending from the hook part 173c screwed to a lower end of the axis part 173b. The weight 174 has a cut part 174a in radial direction through which the axis part 173b can be inserted, The weight 174 also has a fitting convexed part 174b and a fitting concaved part 174c at the upper side and the bottom side thereof respectively so that a plurality of weights can be piled up without slipping. Such weights may be the same in weight or may be different in weight (for example, one-kilo weight and two-kilo weight).

An angle detector 157 is connected to the base end portion 154a of the tension bar 154 through the medium of a connecting axis 159 and also is connected to control means 158. The connecting axis 159 is supported rotatably by a bearing 160.

In the above composition, when the tension bar 154 inclines vertically from the horizontal state, the running route of the cord 5 changes and accordingly the load applied to the cord 5 changes, with the result that it becomes impossible to tie a substantial tension load to the cord 5. In order to prevent such phenomenon, the control means 158 which received an angle signal of the tension bar 154 from the angle detector 157 controls the turning speed of the pull rollers 129, 131 of the second pull roller device 122 so as to keep the tension bar in almost horizontal state at all times, thereby giving the fixed tension to the cord 5.

Guide rollers 161, 162, 163, 164 which guide the cord 5 are arranged inside the cover members 23, 38 and in front and rear of the fourth dip tank means 14 respectively. Also, guide rollers 165, 166, 167, 168, 169, 170 are arranged in front of each tension control device 151, 152, 153.

Figure 19:
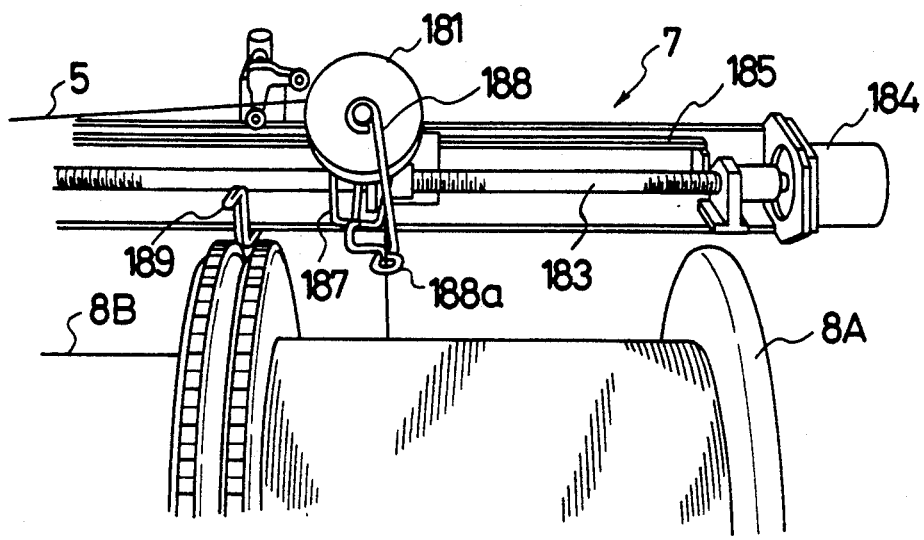
FIG. 19 and FIG. 20 are perspective views of an automatic winding machine, as seen from the front side and the lateral side respectively.
Figure 20:
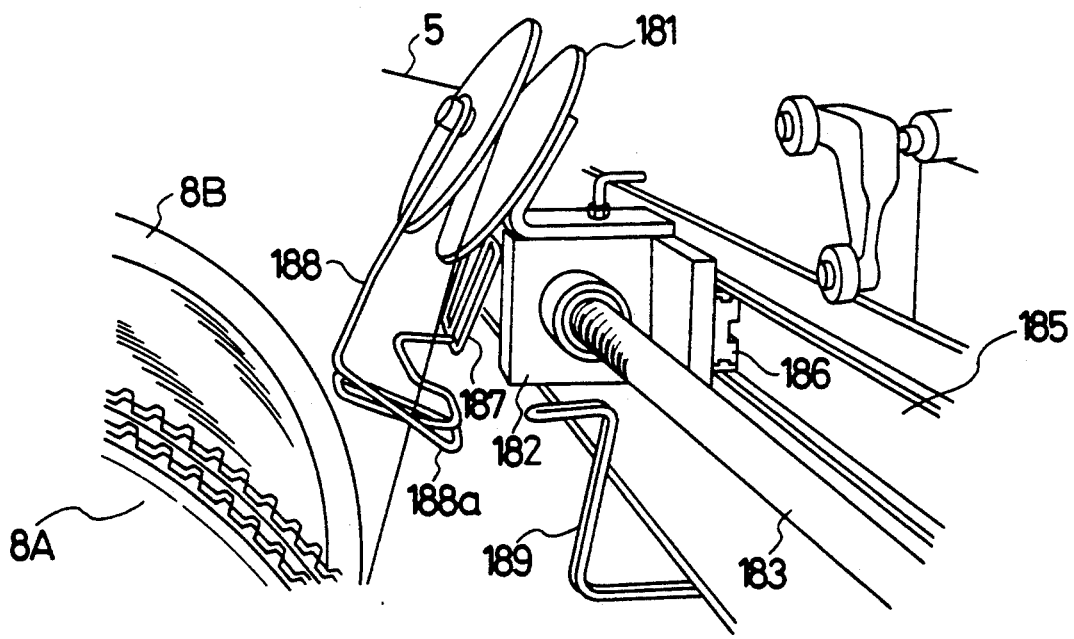

As shown in FIG. 19 and FIG. 20, at the automatic winder 7 a traverse pulley 181 around which the treated cord 5 is wound before it is wound around the bobbins 8A, 8B is supported rotatably by a movable stand 182 and is screwed movably on a screw rod 183 extending along the axial line of the bobbins 8A, 8B. The screw rod 183 is driven for rotation by a driving motor 184. By rotation of the screw rod 183, the movable stand 182, namely, the traverse pulley 181 traverses between the first bobbin 8A and the second bobbin 8B so that winding of the cord 5 can be changed from the first bobbin 8A to the second bobbin 8B or vice versa.

The movable stand 182 has an engaging convexed part 186 which engages slidably with a fixed rail member 185 extending in parallel with the screw rod 183, whereby the movable stand 182 is prevented from rotating with the rotation of the screw rod 183.

Figure 21:
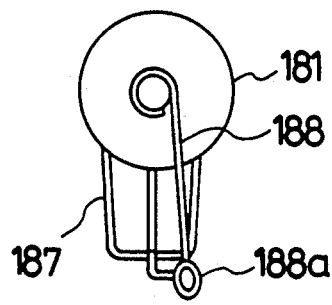
FIG. 21 is an explanatory drawing of a traverse pulley.
Figure 22:
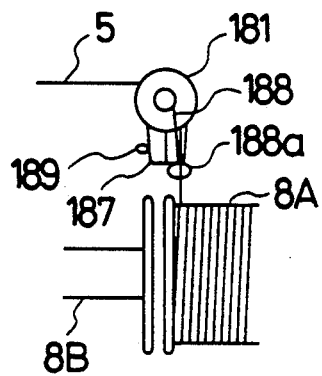
FIG. 22 through FIG. 25 are explanatory drawings of the movement of the traverse pulley.
Figure 23:
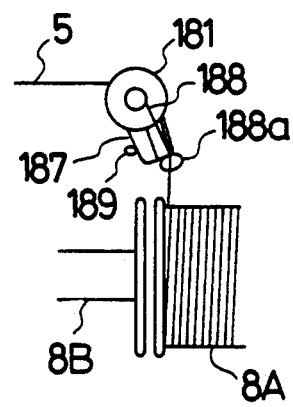
Figure 24:
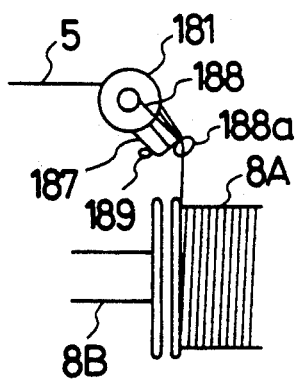
Figure 25:
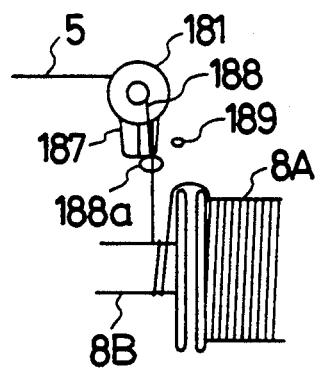

As shown in FIG. 21, the traverse pulley 181 carries an engaging member 187 which is made of wire rod and projects radially (normally in downward direction) and also a guide member 188 having a guide part 188a at the top end thereof for guiding the cord 5. The guide part 188a projects outwardly further than the engaging member 178 in a radial direction of the traverse pulley 181.

Arranged between the first bobbin 8A and the second bobbin 8B is a stopper 189 which, when the traverse pulley 181 moves from the first bobbin 8A to the second bobbin 8B or vice versa, engages with the engaging member 187 and rotates the traverse pulley 181 upwardly so as to displace the guide part 188a of the guide member 188 upwardly.

In the above composition, at the first zone $Z_1$ the cord 5 drawn out from the cheese 4 for dip treating is wound around between the pull rollers 125, 127 of the first pull roller device by plural turns and tension is cut. More particularly, the cord 5 which has entered the flute 125a of the upper fluted pull roller 125 enters the lower plain pull roller 127 and then enters the next flute 125b of the fluted roller 125. In this way, the cord 5 is finally drawn out from the flute 125d. At this time, the cord 5 is held by friction between the cord 5 and the surface of the pull rollers 125, 127 and tension of the cord 5 before and behind the pull roller device 121 is cut. Both pull rollers 125, 127 are rotated synchronously at the same speed by the driving motor 138.

Then, the cord 5 is wound around the upper and the lower dip rollers 20, 21 in the dip tank 19 by plural turns through the medium of a Guide roller 161 which is adjacent to the upper pull roller 125 of the first pull roller device 121 and is located in the cover member 23 of the first dip tank means 11 for the dip treatment of the first stage.

After the quantity of adhesives to be stuck to the cord 5 is regulated through the medium of a touch roller 176, the cord 5 passes the rear side of the lower fluted turn roller 44 and is Guided into the first oven 42 for being heated and dried. In the first oven 42, the cord 5 is wound around between the upper and the lower fluted turn rollers 43, 44 by plural turns for drying of adhesives, drawing and heat setting. Similar operations are carried out at the second, the third and the fourth zones $Z_2$, $Z_3$, $Z_4$ with different kinds of adhesives.

Figure 9:
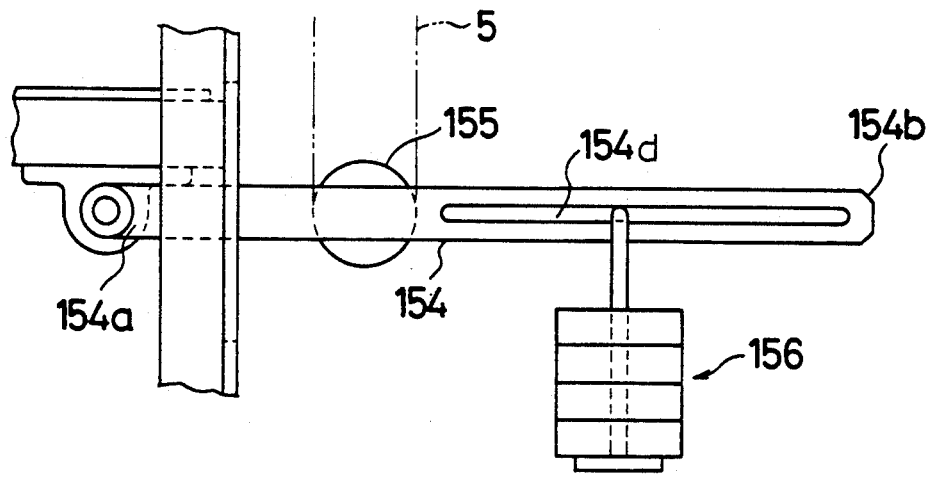
Figure 10:
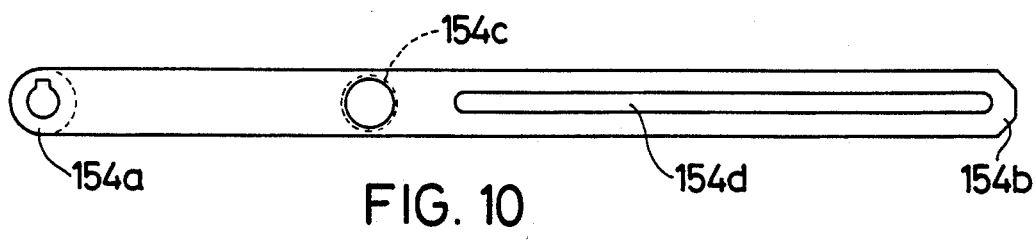
FIG. 10 is a front view of a tension bar.
Figure 11:
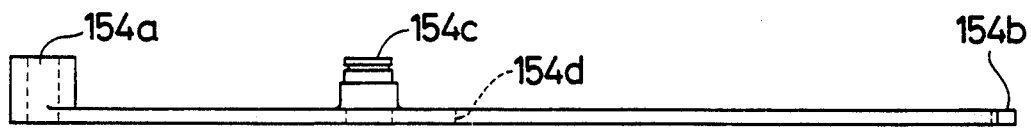
FIG. 11 is a plan view of the tension bar shown in FIG. 10.
Figure 15:
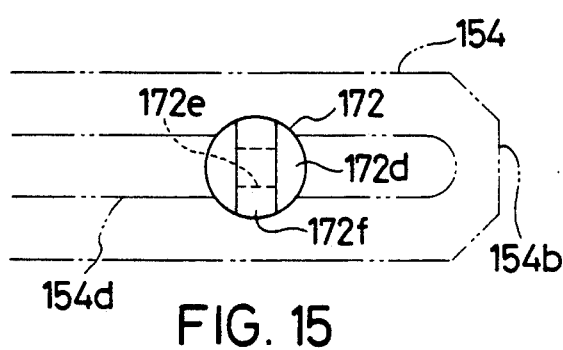
FIG. 15 is a front view of the slider shown in FIG. 13.
Figure 13:
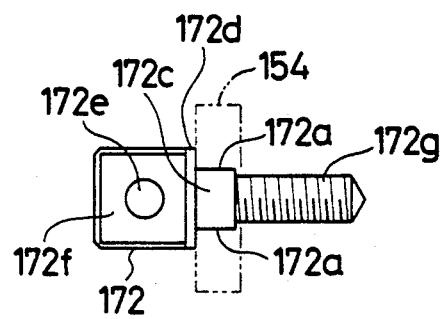
FIG. 13 is a side view of a slider.
Figure 12:
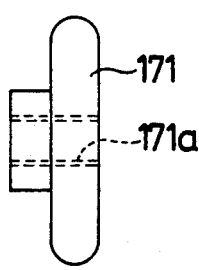
FIG. 12 is a front view of an operation knob.
Figure 14:
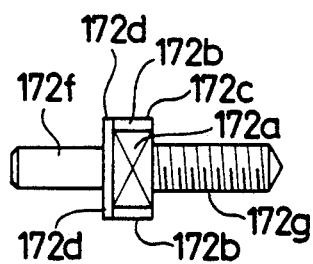
FIG. 14 is a plan view of the slider shown in FIG. 13.
Figure 16:
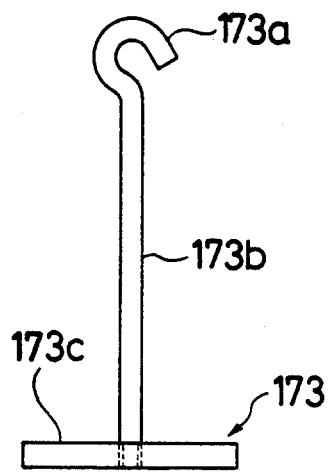
FIG. 16 is a front view of a hanger.
Figure 17:
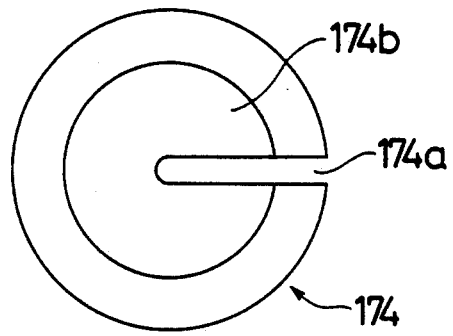
FIG. 17 is a plan view of a weight.
Figure 18:
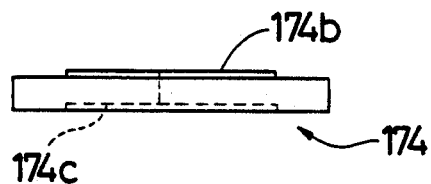
FIG. 18 is a front view of the weight shown in FIG. 17.

The cord 5 which is drawn out from the oven 42 through the medium of guide rollers 165, 166 is regulated in tension by the first tension control device 151, namely, tension is applied to the cord 5 wound around the tension roller 155 by making a tension weight means 156 work on the cord 5 through the medium of the tension bar 154 (refer to FIG. 9). The tension bar 154 is kept in horizontal state at all times by controlling the rotating speed of the pull rollers 129, 131 of the second pull roller device 122 by control means (not shown in the drawing). Thus, tension control is carried out so that tension of the cord 5 is kept almost constant.

Then, the cord 5 whose temperature was raised by heating and drying in the oven 42 is sent to the first cooling means 61 (rollers 65, 66) to be cooled down below the specified temperature (temperature at which physical property of the cord is not changed).

After the cord 5 is cooled, it is sent to the second pull roller device 122 which is located between the first zone $Z_1$ and the second zone $Z_2$.

At the second zone $Z_2$, the cord 5 is wound around a pair of dip rollers 26, 27 of the second dip tank means 12 by plural turns, is dip-treated and is heated and dried in the second oven 49.

Then, the cord 5 is wound around a pair of rollers 67, 68 composing the second cooling means 62 by plural turns via the Guide rollers 167, 168 and the second tension control device 52, and then is wound by plural turns around the third pull roller device 123 which is between the second zone $Z_2$ and the third zone $Z_3$.

At the third zone $Z_3$, similarly to the second zone $Z_2$ the cord is wound by plural turns around a pair of dip rollers 28, 29 in the dip tank 25 of the third dip tank means 13 and is heated and dried in the third oven 50. Then, the cord 5 is wound by plural turns around a pair of rollers 69, 70 of the third cooling means 63 via the guide rollers 169, 170 and the third tension control device 153 and is set to the fourth dip tank means 14 via a pair of Guide rollers 163, 162.

At the fourth zone $Z_4$, the cord 5 is wound by two turns around the dip roller 36 (having two flutes) in the dip tank 35 of the fourth dip tank means and is heated and dried in the fourth oven 57. Then, the cord 5 is finally wound around the bobbins 8A, 8B of the automatic winder 7 via the guide roller 164 and a pair of rollers 71, 72 of the fourth cooling means 64.

At winding by the automatic winder 7, ending of the first cheese winding is detected by a joint detector (not shown in the drawing) and according to a signal from the joint detector, the control means outputs a bobbin change signal to a driving motor 184, whereupon the motor 184 works to change bobbins 8A, 8B.

As shown in FIG. 19 and FIG. 20, the screw rod 183 turns by driving by the driving motor 184 and the movable stand 182 moves from the position corresponding to the first bobbin 8A to the position corresponding to the second bobbin 8B. At this time, since the stopper 189 is located between the first bobbin 8A and the second bobbin 8B, in the course of movement of the traverse pulley 181 the stopper 189 engages with the engaging member 187, whereby the traverse pulley 181 is rotated and accordingly the guide part 188a of the guide member 188 fitted to the traverse pulley 181 is displaced upwardly. Thus, the path of the cord 5 is displaced upwardly.

When movement of the movable stand 182 continues and the traverse pulley 181 comes to the position corresponding to the second bobbin 8B, the stopper 189 disengages from the engaging member 187 and the cord 5 is wound around the second bobbin 8B.

As the traverse pulley 181 moves toward the fourth pull roller device 124 at the accelerated speed, if the winding speed of the automatic winder 7 does not follow the moving speed of the traverse pulley 181, the cord 5 will slacken between the traverse pulley 181 and the fourth pull roller device 124. However, since such slackening of the cord 5 is absorbed by the dancer roller 206 being moved downwardly due to dead weight of the dance roller 206 and the slider 74. Therefore, such slackening of the cord 5 is not transmitted to the fourth pull roller device 124 and there is no fear that the cord 5 droops from each pull roller of the fourth pull roller device 124. Thus, irrespective of winding state of the bobbin 8A, bobbin change can be carried out, free from the cord 5 drooping between the bobbins 8A, 8B.

In the second and the third dip tank means 12, 13 for sticking RFL liquid to the surface of cord, with the rotation of the dip rollers 26, 27, 28, 29 by running of the cord 5, a coil spring in the center hole of the dip rollers 26, 27, 28, 29 (only the coil spring 34 is shown for the dip roller 27 in FIG. 5) also rotates and by the rotation of the coil spring, flowing of adhesives occurs in the center hole of the dip rollers 26–29. Thus, adhesives in the center hole of the dip rollers 26–29 move at all times and coagulation of adhesives (RFL liquid) is restricted.

Therefore, there is no fear that coagulation of adhesives stick to the axis member supporting the dip rollers 26–29 rotatably, namely, the dip rollers 26–29 rotate smoothly at all times and there is no fear that coagulations of adhesives flow out into adhesives in the tank dipersedly and stick to the surface of the cord 5, causing poor adhesion.

In the above embodiments, the dipping treatment device is composed of four zones in continuation but in the case where adhesion of only one kind of adhesives is suffice, the device may be composed of only one zone. Alternatively, four zones ere made independent from one another and dip treatment is carried out independently.

A description is made below of the flowing of intake and exhaust, with reference to FIG. 26.

At the first zone $Z_1$, a pair of blowers 91, 92 are arranged at the upper part of the rear side of the oven 42. Hot air is supplied into the oven 42 from the blowers 91, 92 via heaters 93, 94 and is sent to the slit member 41 in the oven 42. Then, the hot bit blows off through the slit 41a of the slit member 41 to heat uniformly the cord 5 running in the oven 42 in a vertical direction. The hot air in the oven 42 is exhausted by a blower 113 located at the lower part of the rear side of the oven 42. The blower 113 also exhausts the inside of the cover member 23 surrounding the first dip tank 19.

At the second and the third zones $Z_2$, $Z_3$, basically intake and exhaust are carried out in the same way as in the case of the first zone $Z_1$, but only one blower (101 at the second zone and 102 at the third zone) and only one heater (104 at the second zone and 105 at the third zone) are arranged and a part of the hot air exhausted by the blower 115 located at the lower part of the rear side of the second oven 49 is returned to the blower 101, 102 for recirculation and reuse.

At the fourth zone $Z_4$, no slit member is provided in the fourth oven 57 and hot air flows in the oven 57 from the upper part to the lower part and is exhausted by the blower 114. Similarly to the first zone $Z_1$, the blower 114 also exhausts the inside of the cover member 38 of the fourth dip tank 35. The treated cord 5 is wound onto the bobbin 8 of the automatic winder 7 from the fourth zone $Z_4$.

As mentioned above, dip tanks 19, 24, 25, 35 are arranged at the lower part, the ovens 42, 49, 50, 57 are arranged above the dip tanks 19, 24, 25, 35, the blowers 111, 112, 101, 102, 103 of the hot air supplying means and the blowers 113, 115, 114 of the exhausting means 85–88 are arranged at the upper part and the lower part respectively of the rear side of the ovens 42, 49, 50, 57 and the cooling means 61–64 are arranged at the side of the ovens 42, 49, 50, 57. Thus, the above various parts are arranged in vertical direction, instead of lateral direction in the case of the conventional device, namely the overall shape of the device according to the present invention becomes compact and less space is required for installation of the device of the present invention.

In the above-mentioned device, in the case where the cord 5 is wound around the traverse pulley via the fourth pull roller device 124 having a pair of pull rollers 126, 128 end then is wound around the bobbin 8A, 8B due to movement of the traverse pulley 181 toward the fourth pull roller device 124 at the bobbin change, the cord 5 slackens and may droop from the pull rollers 126, 128 of the fourth pull roller device 124. More particularly, when changing the first bobbin 8A to the second bobbin 8B, the traverse pulley 181 with which the cord 5 engages moves from the first bobbin 8A side to the second bobbin 8B side (namely, to the fourth pull roller device side), whereupon the cord 5 between the traverse pulley 181 and the fourth pull roller device 124 slackens and slips off the fourth pull roller device 124 which is on the second bobbin 8B side. This is due to the fact that when the traverse pulley 181 moves at the accelerated speed, the running speed of the automatic winder 7 cannot follow the accelerated speed of the traverse pulley 181 owing to heavy weight of the bobbins 8A, 8B and as a result, the cord 5 may slacken (20 cm-50 cm, for example). In order to avoid such phenomenon, a cord tension device 201 can be provided between the fourth pull roller device 124 and the automatic winder 7.

Figure 28:
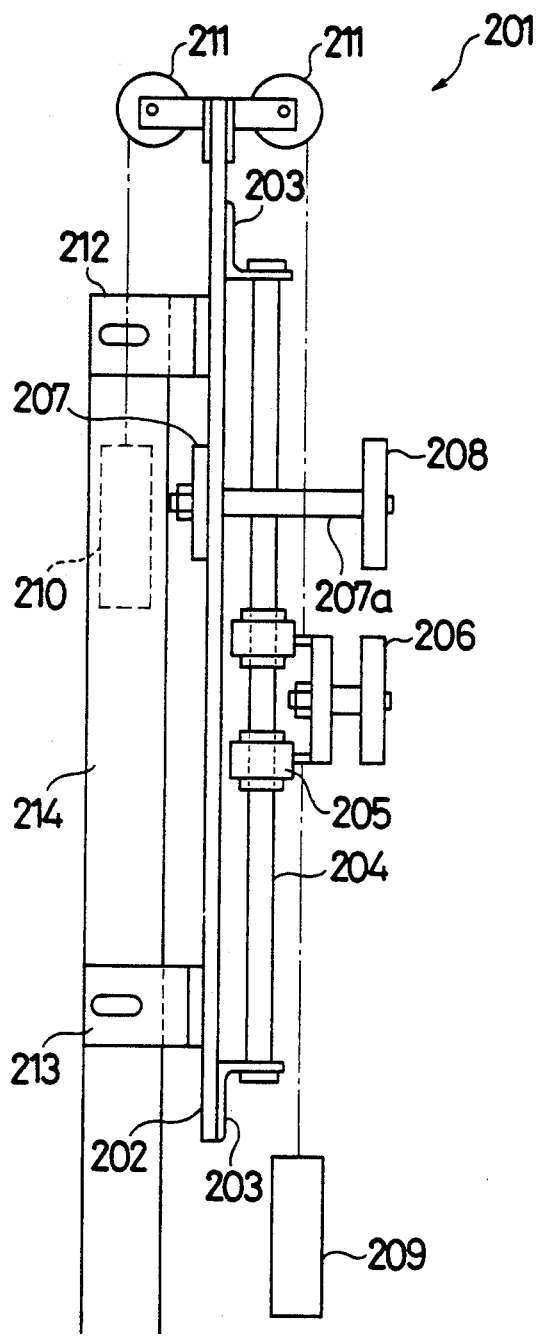
FIG. 28 is a side view of the cord tension device.
Figure 29:
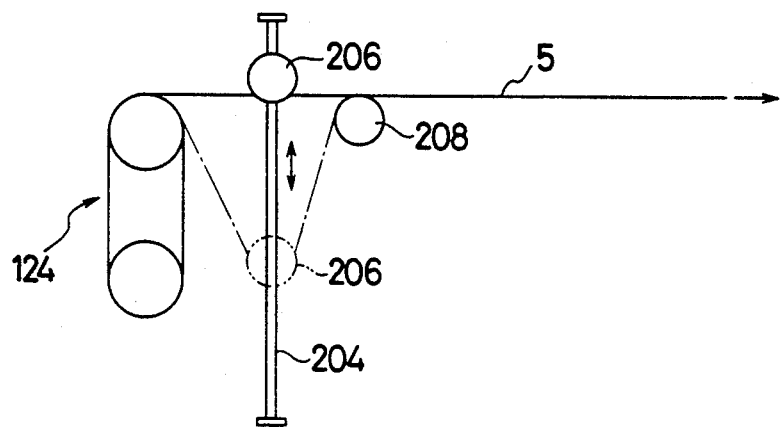
FIG. 29 is an explanatory drawing of the movement of a dancer roller.
Figure 30:
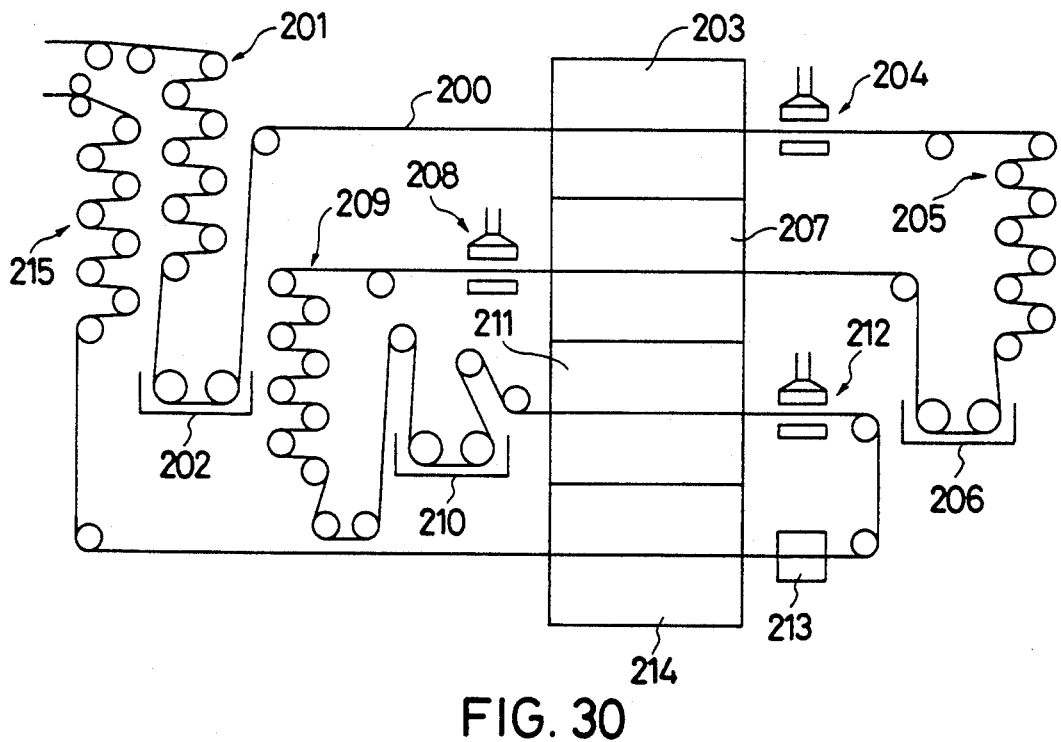
FIG. 30 is a rough sketch of a conventional dip treating device.

As shown in FIG. 28, the above cord tension device 201 has a dancer roller 206 which is fitted slidably in a vertical direction, via a slider 205, to a guide bar 204 whose upper and lower end portions are fixed to a base frame 202 by fixtures 203. A bracket 207 is fitted to the base frame 202 and a shaft 207a with a fixed roller 208 supported rotatably at a top end thereof is fitted to the bracket 207. The dip-treated cord 5 is wound around the dancer roller 206 and is sent to the traverse pulley 181 via the fixed roller 208. The fluted parts of the dancer roller 206 and the fixed roller 208 which make contact with the cord 5 are made of ceramic material to improve wear-resistance.

Figure 27:
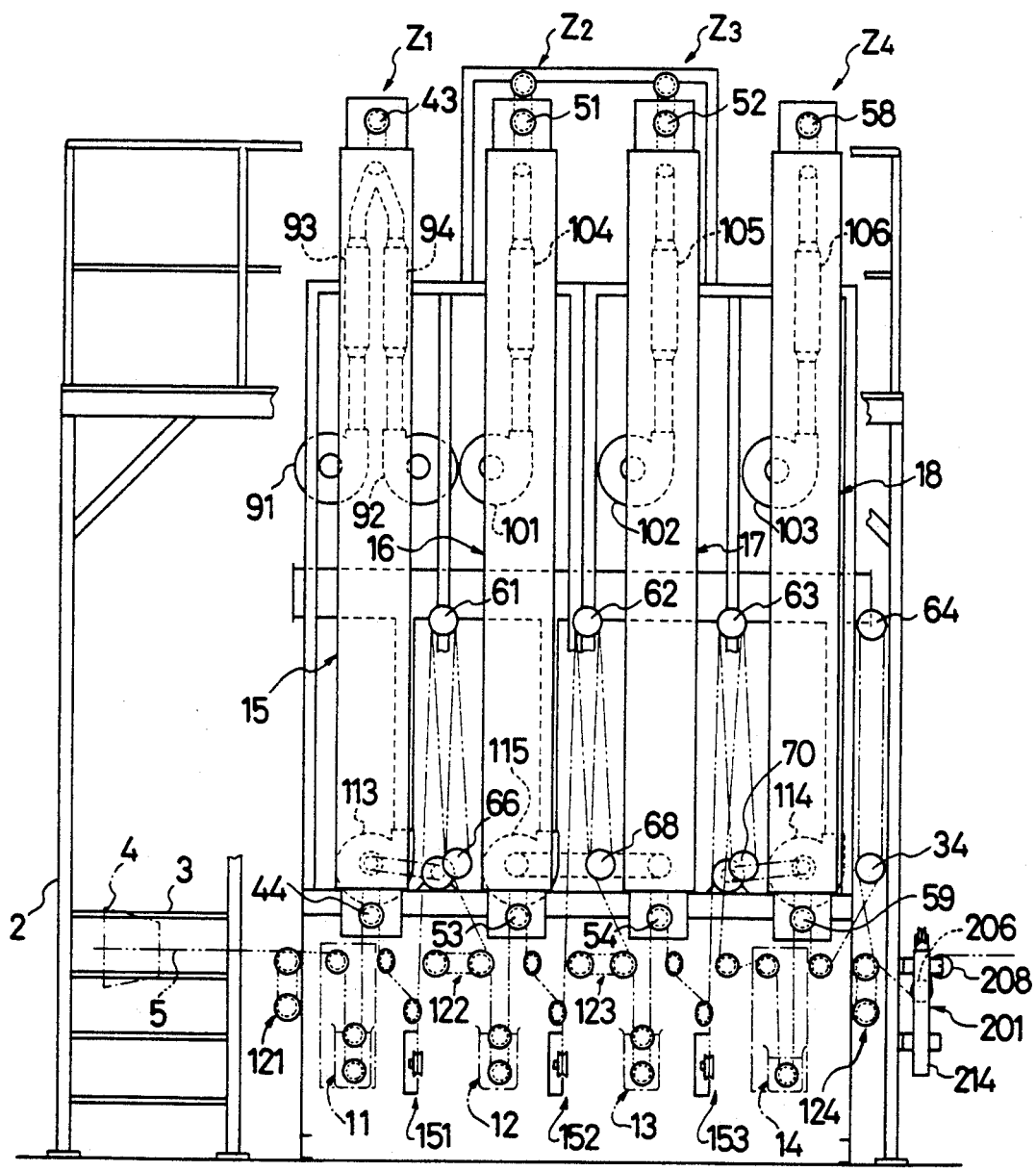
FIG. 27 is a front view of the case where a cord tension device is arranged.

A weight 209 hangs down from the slider 205 to urge the dancer roller 206 to move downwardly. Also, another weight 210 for adjusting weight is linked with the slider 205 via a pair of pulleys 211 supported slidably at a top end of the base frame 202. This weight 210 urges the slider 205 to move upwardly and goes up and down in a tubular member 214 which is fitted to the base frame 202 through the medium of fixing members 212, 213. This weight 210 moves downwardly if tension of the automatic winder 7 becomes higher than usual and thus regulation of the load can be done. The cord tension device 201 is fitted to the lower part of the inspecting stand 2 on the fourth zone $Z_4$ side (refer to FIG. 27).

As the present invention can be embodied in various types without departing from its substantial characteristics, the above embodiments have been given solely for explanation purposes and are not of restrictive nature. Furthermore, as the scope of the present invention is not limited by the description made preceding the claim but is limited by the scope of claim for patent, any change in the requirements of the scope of claim for patent and equivalents to such requirements are included in the scope of claim for patent.

What is claimed is:

1. A vertical type dip treating device for applying adhesives to a cord to be used as a tension member of a belt, said device comprising:
   dip tank means for applying an adhesive to a cord;
   heating and drying means arranged above said dip tank means for heating and drying the cord having adhesive applied thereto by said dip tank means;
   cooling means positioned adjacent to said heating and drying means for cooling the cord which is heated and dried by said heating and drying means and removed from said heating and drying means;
   hot air supplying means linked with said heating and drying means for supplying hot air to said heating and drying means; and
   exhausting means linked with said heating and drying means and arranged at a position shifted in a vertical direction from said hot air supplying means for discharging exhaust from said heating and drying means;
   wherein the heating and drying means includes an oven having an upper part and a lower part including fluted turn rollers arranged at the upper part and the lower part of said oven and the dip tank means has at least one dip roller which is arranged rotatably in the dip tank and around which the cord to be dip treated is wound, an axis member which carries an axis part to be fitted in a center hole of said dip roller and supports the dip roller rotatably, and a coil spring disposed rotatably between the center hole of the dip roller and the axis part of the axis member.

2. A vertical type dip treating device as defined in claim 1, wherein the dip tank means has a dip tank in which adhesives are held, the heating and drying means has a top roller which is at the upper part of the oven above the upper fluted turn roller, and the cord which is firstly wound around the upper fluted turn roller is wound around the top roller.

3. A vertical type dip treating device as defined in claim 1 further comprising:
   a cord winder which continuously winds the cord around first and second bobbins arranged coaxially in spaced side-by-side relationship after the cord has been wound by plural turns around a pull roller device, said pull roller device having a pair of pull rollers, a traverse pulley which moves between the bobbins for guiding the cord from one bobbin to the other bobbin and a dancer roller arranged between the pull roller device and the traverse pulley for tensioning the cord at all times.

4. A vertical type dip treating device as defined in claim 1, further including cover means enclosing said dip tank means for isolating said dip tank means from its surroundings.

5. A vertical type dip treating device as defined in claim 4 wherein said exhausting means is linked with said cover means for venting the interior of said enclosed dip tank means.

6. A vertical type dip treating device as defined in claim 1 wherein said cooling means include a plurality of rollers, said rollers cooperating with one another to extend a path length of travel of the cord after the cord has been heated and dried by said heating and drying means.

7. A vertical type dip treating device for applying adhesives to a cord to be used as a tension member of a belt, said device comprising:
   dip tank means for applying an adhesive to a cord;

heating and drying means arranged above said dip tank means for heating and drying the cord having adhesive applied thereto by said dip tank means;

cooling means positioned adjacent to said heating and drying means for cooling the cord which is heated and dried by said heating and drying means and removed from said heating and drying means;

hot air supplying means linked with said heating and drying means for applying hot air to said heating and drying means; and exhausting means linked with said heating and drying means and arranged at a position shifted in a vertical direction from said hot air supplying means for discharging exhaust from said heating and drying means;

wherein the heating and drying means includes an oven having an upper part and a lower part including fluted turn rollers arranged at the upper part and the lower part of said oven and further comprising a tension control device for maintaining tension on the cord substantially constant, said tension control device including a tension bar positioned horizontally or at an angle of inclination with the horizontal and having a rotatably supported base end portion and a slot within said bar which extends in an axial direction away from said base end, a tension weight means suspended from and beneath said tension bar intermediate its ends and engaged slidably with the slot of said tension bar, a tension roller which is supported rotatably by said tension bar and around which the cord is wound for running the cord at a predetermined speed, an angle detector which is linked with said tension bar and detects the angle of inclination of the tension bar, and a control means which receives a signal from said angle detector and controls the running speed of the cord so that the tension bar is kept at a horizontal state.

8. A vertical type dip treating device as defined in claim 7, wherein the tension roller is at least a non-adhesive pulley formed with aramid resin containing polytetrafluoroethylene.

9. A vertical type dip treating device as defined in claim 7, wherein the tension control device further has one plain pull roller, one fluted pull roller with a plurality of flutes and a driving means for driving both pull rollers for synchronous rotation, whereby a cord which has entered said fluted pull roller is wound around both pull rollers by plural turns and is drawn out from said fluted pull roller.

10. A vertical type dip treating device as defined in claim 7, wherein said tension weight means includes hanger means comprising an upper portion for slidably engaging said slot and a lower portion for supporting weights thereon.

11. A vertical type dip treating device for applying adhesives to a cord to be used as a tension member of a belt, said device comprising:

dip tank means for applying an adhesive to a cord;

heating and drying means arranged above said dip tank means for heating and drying the cord having adhesive applied thereto by said dip tank means;

cooling means positioned adjacent to said heating and drying means for cooling the cord which is heated and dried by said heating and drying means and removed from said heating and drying means;

hot air supplying means linked with said heating and drying means for supplying hot air to said heating and drying means; and exhausting means linked with said heating and drying means and arranged at a position shifted in a vertical direction from said hot air supplying means for discharging exhaust from said heating and drying means;

wherein the heating and drying means includes an oven having an upper part and a lower part including fluid turn rollers arranged at the upper part and the lower part of said oven and further comprising:

an automatic winder which continuously winds the cord around first and second bobbins arranged coaxially in a row at specified intervals;

a movable stand arranged movably between the first bobbin and the second bobbin;

a traverse pulley supported rotatably by said movable stand;

an engaging member fitted to said traverse pulley and projecting radially;

a guide member which is fitted to said traverse pulley and has a guide part for guiding the cord radially and outwardly of said traverse pulley;

a stopper which engages with said engaging member when the traverse pulley moves and displaces the guide part of the guide member upward by rotating the traverse pulley; and driving means which is linked with said movable stand and moves said movable stand.

12. A vertical type dip treating device for applying plural kinds of adhesives to a cord to be used as a tension member of a belt, said device comprising:

a plurality of dip tank means for applying adhesives to a cord;

a plurality of heating and drying means arranged above said dip tank means for heating and drying the cord having adhesives applied thereto by a corresponding dip tank means;

a plurality of cooling means positioned adjacent to said heating and drying means for cooling the cord heated and dried by each heating and drying means and removed from the heating and drying means;

at least one hot air supplying means which is connected to and positioned adjacent said heating and drying means and which supplies hot air to each heating and drying means; and at least one exhausting means which is connected to and positioned adjacent said heating and drying means and discharges exhaust from each heating and drying means;

wherein each heating and drying means includes an oven having an upper part and a lower part and the lower part of said oven and each dip tank means has at least one dip roller which is arranged rotatably in the dip tank and around which the cord to be dip treated is wound, an axis member which carries an axis part to be fitted in a center hole of said dip roller and supports the dip roller rotatably, and a coil spring disposed rotatably between the center hole of the dip roller and the axis part of the axis member.

13. A vertical type dip treating device as defined in claim 12, wherein each dip tank means has a dip tank in which adhesives are held, each heating and drying means has a top roller which is at the upper part of the oven and above the upper fluted turn roller, and a cord which is firstly wound around the upper fluted turn roller is wound around the top roller.

14. A vertical type dip treating device as defined in claim 12, further comprising:
a cord winder which continuously winds the cord around first and second bobbins arranged coaxially in spaced side-by-side relationship after the cord has been wound by plural turns around a pull roller device, said pull roller device having a pair of pull rollers, a traverse pulley which moves between the bobbins for guiding the cord from one bobbin to the other bobbin and a dancer roller arranged between the pull roller device and the traverse pulley for tensioning the cord at all times.

15. A vertical type dip treating device as defined in claim 12, further including cover means enclosing two of said plurality of dip tank means for isolating said two of said plurality of dip tank means from its surroundings.

16. A vertical type dip treating device as defined in claim 15 wherein said exhausting means is linked with said cover means for venting the interior of said enclosed two of said dip tank means.

17. A vertical type dip treating device as defined in claim 12 wherein said cooling means include a plurality of rollers, said rollers cooperating with one another to extend a path length of travel of the cord after the cord has been heated and dried by a respective one of said heating and drying means.

18. A vertical type dip treating device for applying plural kinds of adhesives to a cord to be used as a tension member of a belt, said device comprising:
a plurality of dip tank means for applying adhesives to a cord;
a plurality of heating and drying means arranged above said dip tank means for heating and drying the cord having adhesives applied thereto by a corresponding dip tank means;
a plurality of cooling means positioned adjacent to said heating and drying means for cooling the cord heated and dried by each heating and drying means and removed from the heating and drying means;
at least one hot air supplying means which is connected to and positioned adjacent said heating and drying means and which supplies hot air to each heating and drying means; and
at least one exhausting means which is connected to and positioned adjacent said heating and drying means and discharges exhaust from each heating and drying means;
wherein each heating and drying means includes an oven having an upper part and a lower part including fluted turn rollers arranged at the upper part and the lower part of said oven and further comprising a plurality of tension control devices for keeping tension on the cord substantially constant, each tension control device including a tension bar positioned horizontally or at an angle of inclination with the horizontal and having a rotatably supported base end portion and a slot within said bar which extends in an axial direction away from said base end, a tension weight means suspended from sand beneath said tension bar intermediate its ends and engaged slidably with the slot of said tension bar, a tension roller which is supported rotatably by said tension bar and around which the cord is wound for running the cord at a predetermined speed, an angle detector which is linked with said tension bar and detects the angle of inclination of the tension bar, and a control means which receives a signal from said angle detector and controls the runner speed of the cord so that the tension bar is kept at a horizontal state.

19. A vertical type dip treating device as defined in claim 18, wherein each tension roller is at least a non-adhesive pulley formed with aramid resin containing polytetrafluoroethylene.

20. A vertical type dip treating device as defined in claim 18, wherein each tension control device further has one plain pull roller, one fluted pull roller with a plurality of flutes and a driving means for driving both pull rollers for synchronous rotation, whereby a cord which has entered said fluted pull roller is wound around both pull rollers by plural turns and is drawn out from said fluted pull roller.

21. A vertical type dip treating device as defined in claim 18, wherein said tension weight means includes hanger means comprising an upper portion for slidably engaging said slot and a lower portion for supporting weights thereon.

22. A vertical type dip treating device, for applying plural kinds of adhesives to a cord to be used as a tension member of a belt, said device comprising:
a plurality of dip tank means for applying adhesives to a cord;
a plurality of heating and drying means arranged above said dip tank means for heating and drying the cord having adhesives applied thereto by a corresponding dip tank means;
a plurality of cooling means positioned adjacent to said heating and drying means for cooling the cord heated and dried by each heating and drying means and removed from the heating and drying means;
at least one hot air supplying means which is connected to and positioned adjacent said heating and drying means and which supplies hot air to each heating and drying means; and
at least one exhausting means which is connected to and positioned adjacent said heating and drying means and discharges exhaust from each heating and drying means;
wherein each heating and drying means includes an oven having an upper part and a lower part including fluted turn rollers arranged at the upper part and the lower part of said oven and further comprising:
an automatic winder which continuously winds the cord around first and second bobbins arranged coaxially in a row at specified intervals;
a movable stand arranged movably between the first bobbin and the second bobbin;
a traverse pulley supported rotatably by said movable stand;
an engaging member fitted to said traverse pulley and projecting radially;
a guide member which is fitted to said traverse pulley and has a guide part for guiding the cord radially and outwardly of said traverse pulley;
a stopper which engages with said engaging member when the traverse pulley moves and displaces the guide part of the guide member upward by rotating the traverse pulley; and
driving means which is linked with said movable stand and moves said movable stand.

* * * * *